Figure 1:
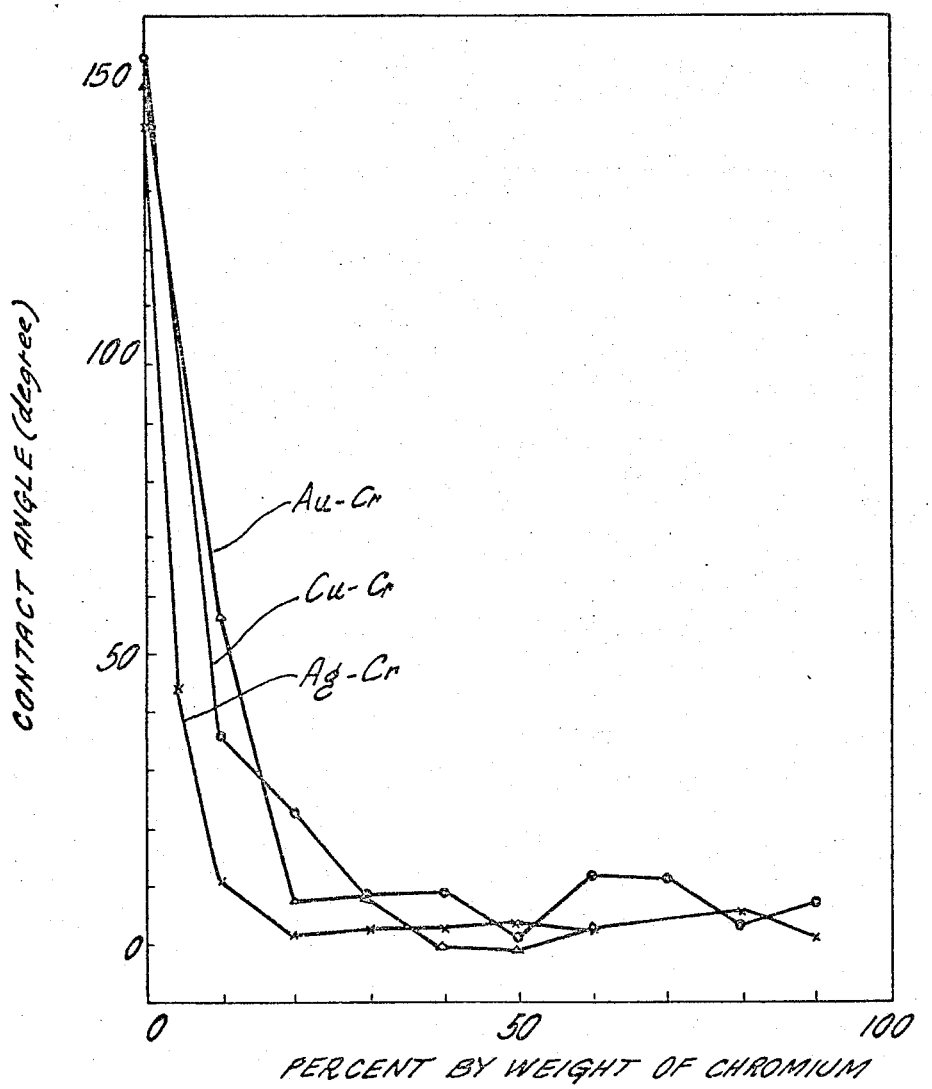

United States Patent [19]
Takamori et al.

[11] 3,713,790
[45] Jan. 30, 1973

[54] JOINED BODY OF PYROLYTIC GRAPHITE AND METALLIC MEMBERS

[75] Inventors: Takeshi Takamori; Masanobu Akanuma, both of Tokyo-to, Japan

[73] Assignee: Nippon Electric Company, Limited, Tokyo-to, Japan

[22] Filed: Aug. 12, 1969

[21] Appl. No.: 849,463

[30] Foreign Application Priority Data

Aug. 14, 1968 Japan................................43/57883

[52] U.S. Cl.....................................29/195, 29/473.1
[51] Int. Cl. ...............................................B32b 15/04
[58] Field of Search..........................29/195 C, 473.1

[56] References Cited

UNITED STATES PATENTS

| | | | |
|---|---|---|---|
| 3,122,424 | 2/1964 | King | 29/195 |
| 3,356,468 | 12/1967 | Pinter | 29/195 |
| 3,425,116 | 2/1969 | Crooks et al. | 29/195 X |
| 3,442,006 | 5/1969 | Guichet et al. | 29/195 X |
| 3,497,332 | 2/1970 | Donnelly et al. | 29/195 |

*Primary Examiner*—L. Dewayne Rutledge
*Assistant Examiner*—E. L. Weise
*Attorney*—Ostrolenk, Faber, Gerb & Soffen

[57] ABSTRACT

A method for joining pyrolytic graphite to metallic members by using a brazing composition comprising at least 90 percent by weight of a copper-chromium, gold-chromium, or silver-chromium mixture.

1 Claim, 1 Drawing Figure

JOINED BODY OF PYROLYTIC GRAPHITE AND METALLIC MEMBERS

This invention relates to a joined body comprising a pyrolytic graphite member and a metallic member and a method of joining those members into a joined body which is particularly useful at elevated temperatures of at least about 700° C.

For the purpose of the invention, the term pyrolytic graphite as herein used means the known polycrystalline material formed by pyrolyzing one or more different types of carbonaceous gases (i.e., gases containing carbon) at a reduced or normal pressure or in the presence of another gas or gases, to the extent that the deposition of the carbon is caused onto a heated surface of a substrate. The material usually has a layer structure, the layers being formed parallel to the heated surface on which they are deposited. Since the bonding strength of the adjoining layers in the direction perpendicular to the layer plane (or in the direction of axis $c$ as it is called hereinafter) is significantly lower than that along the layer plane (or in the direction of axis $a$ as it is called hereinafter), flaking is likely to occur along the layer plane. To obtain firm joining of such pyrolytic graphite material with a metallic member, it is essential to use a surface parallel to the axis $c$ of the material as the joining surface, and to choose a brazing material that can impart an acceptable wetting property or brazeability on the joining surface of the material and also on that of the metallic member. Because pyrolytic graphite has an extremely low thermal expansion coefficient in the direction of axis $a$ in sharp contrast to a very high coefficient in the direction of axis $c$, joining of such graphite with a metallic member would result in a fairly great internal stress within the joined portion of the two members. In this case a desirable condition for brazing is that the weakest point of the joined portion lies in the pyrolytic graphite, and not in the brazing metal nor in the interface between the brazing metal and the graphite. In other words, the strongest joined body of pyrolytic graphite and metallic members is one whose strength depends on the strength of the pyrolytic graphite. To obtain a firmly joined body, the brazing materials are required to have, in addition to the properties above mentioned, sufficient ductility to relieve the internal stress in the joined portion to some extent.

Numerous varieties of brazing materials have heretofore been proposed and tried for joining of the so-called artificial graphite members formed by shaping and sintering carbonaceous powdery materials through the use of conventional methods, with metallic members or with other artificial graphite members. However, none has proved fully satisfactory for the purpose of joining pyrolytic graphite with metallic members. For example, alloys of iron with smaller proportions of nickel or chromium are in many cases employed for joining artificial graphite with metals. Investigations by the inventors have revealed that these alloys are not suitable for brazing between pyrolytic graphite and metal because their wettability with respect to the surface parallel to the axis $c$ of pyrolytic graphite is not quite desirable. In other instances of brazing of artificial graphite to metals, silicon and silicides are used as the brazing agents. These agents have also been found inadequate for the same purpose as above, according to the investigations by the inventors, because they are not merely too brittle as such but, when they melt in contact with the surface parallel to the axis $c$ of pyrolytic graphite, they react vigorously with the pyrolytic graphite, often resulting in the formation of $\beta$-SiC on the joining surface and fracture of the pyrolytic graphite along the layer plane deeply extending into the graphite. In joining an artificial graphite member with a titanium of zirconium member, it is sometimes the practice to employ a brazing metal consisting essentially of one or more members of the group consisting of copper, silver and gold. If such a brazing metal is utilized in the brazing of pyrolytic graphite to a metallic member, a considerably strong joined body will be obtained provided that a suitable amount of titanium or zirconium is diffused into the joining surface of the pyrolytic graphite. Actually, however, the amount and geometry of the brazing material, the brazing temperature, and other pertinent factors are combined delicately to influence the strength of the resulting joined body, thus making it difficult to obtain stabilized conditions. Moreover, the metals with which the pyrolytic graphite is joined are limited to titanium, zirconium or their alloys. Among other proposals is that of joining pyrolytic graphite and artificial graphite members with the aid of titanium carbide, zirconium carbide, titanium or the like. As will be naturally obvious, these brazing materials can hardly be used in joining pyrolytic graphite with metals.

It is an object of the present invention to provide a firmly joined body of pyrolytic graphite and metallic members.

Another object of the invention is to provide brazing materials chosen for joining of pyrolytic graphite member with metallic member.

Yet another object of the invention is to provide a novel method of forming a firmly joined body of a pyrolytic graphite member and a metallic member.

According to this invention, there is provided a joined body comprising a pyrolytic graphite member, a metallic member, and a brazing material sandwiched in between said two members for joining together of the two members and wherein said brazing material is an alloy of a combination of compositions with a total proportion of not less than 90 percent by weight selected from a group of combinations of compositions consisting of combinations of copper-chromium compositions wherein the chromium content ranges from 10 to 75 percent by weight, combinations of silver-chromium compositions wherein the chromium content ranges from 10 to 85 percent by weight, and combinations of gold-chromium compositions wherein the chromium content ranges from 10 to 75 percent by weight. The materials for joining together the pyrolytic graphite member and the metallic member may be an alloy composed principally of one of the above combinations. Alternatively, metals within a certain combination may be arranged in the form of sheets stacked by lamination, cladding or electroplating. In the former, the temperature for the joining operation is selected at a suitable temperature not lower than the melting point of the brazing alloy. In the latter, the joining is carried out simultaneously with alloying the metal sheets by heating to a temperature higher than the melting point of either metal in the combination that has the lower melting point. In either case, the joining should be performed in a non-oxidizing atmosphere such as in a vacuum.

Experiments by the inventors indicated that any of the combinations of metals for brazing whose chromium content is outside the range above specified, normally fails to give a satisfactorily joined body. This will be further demonstrated in connection with some examples of the present invention. Up to this writing, however, it has not been clear why the above limitations to the materials for joining pyrolytic member with metallic members serve advantageously for the purpose of obtaining strongly joined bodies. Presumably the reason for this is the possibility that the cooperation of the reactivity between chromium and pyrolytic graphite and the ductility of copper, silver or gold gives a favorable effect upon the wettability, binding power, and the like, against the pyrolytic graphite.

Now, the wettability of the brazing materials used in the estimation of this invention with respect to pyrolytic graphite will be described below.

The sole FIGURE in the accompanying drawing is a graph showing the wetting properties of alloys covering the composition ranges of brazing materials used in the invention. In the individual combinations, the proportions of chromium added to copper, silver or gold are plotted in percent by weight on the abscissa against the contact angles with the surface parallel to the axis $c$ of pyrolytic graphite on the ordinate. In the graph, each plot represents contact angles which were photographically determined by placing an alloy piece on a small plate of pyrolytic graphite and then melting the same in an atmosphere of argon. It will be appreciated that within the composition ranges of brazing materials used in the invention the individual alloys exhibit very good wettability for pyrolytic graphite. Incidentally, the inventors' study with similar experiments revealed that the brazing materials of Fe alloys containing chromium or nickel, which have often been employed in brazing of artificial graphite, always have contact angles of more than 40 degrees with respect to pyrolytic graphite.

Regarding the binding power exerted between the pyrolytic graphite member and metallic member of the joined body according to the invention, description will be made hereunder in conjunction with specific examples.

It will be readily understood by those skilled in the art that, where a pyrolytic graphite member and a metallic member are to be joined together with the use of a suitable metal as the joining agent or brazing metal, the fracture strength of the joined body thus obtained is generally dictated, because of the sufficiently high strength of the metal member and the strength of the interface of the metal member and the brazing metal, by the strength of the pyrolytic graphite member, by the strength of the interface of the pyrolytic graphite and the brazing metal, or by the strength of the portion of the brazing metal which has been more or less carburized by the presence of the pyrolytic graphite. As described above, it is most desirable that the fracture strength of the joined body is solely dependent upon the fracture strength of the pyrolytic graphite member. Thus, to exemplify the present invention, the three occasions above itemized with the combinations covering the composition ranges of brazing metals used in the invention were compared. The results were as shown in Tables 1 to 3. In each of these experiments, the opposed faces of two pyrolytic graphite pieces which were parallel to the axis $c$ of each pyrolytic graphite piece were joined together with a brazing metal of the invention, then the joined portion was loaded with a force exerted by a steel wedge in the direction parallel to the interface between brazing metal and pyrolytic graphite, and then the location and appearance of the fracture were observed. The observed results were classified with three symbols, A, B, and C according to the location of the fracture. A indicates that the pyrolytic graphite was fractured, B indicates the fracture at the brazing metal portion, and C indicates the fracture at the interface. Table 1 shows the fracture conditions where various combinations of copper and chromium were used as brazing metals. In all of these experiments a constant brazing temperature of 1,470° C. was employed. Table 2 shows the fracture conditions where various combinations of silver and chromium were used as brazing metals, all at a brazing temperature of 1460° C. Table 3 shows the fracture conditions observed with various combinations of gold and chromium as brazing metals, all at a brazing temperature of 1520° C. Throughout the experiments the joining was conducted in an argon atmosphere in an electric furnace. No difference in the location of fractures was observed between the two forms of the brazing metal; one is an alloy of various combinations and the other consists of sheets of those metals stacked with or without cladding or electroplating.

TABLE 1 Composition (wt.%) Cu Cr Location of fractures 100 0 C 75 25 A 71 29 A 61 39 A 54 46 A 48 52 A 42 58 A 32 68 A 22 78 B 16 84 B TABLE 2 Composition (wt.%) Ag Cr Location of fractures 100 0 C 87 13 A 77 23 A 71 29 A 65 35 A 62 38 A 48 52 A 38 62 A 30 70 A 19 81 A 13 87 B TABLE 3 Composition (wt.%) Au Cr Location of fractures 100 0 C 81 19 A 71 29 A 60 40 A 50 50 A 40 60 A 30 70 A It should be obvious from Tables 1 to 3 that, the combinations of copper, silver, gold and chromium as brazing metals have beneficial effects provided that they are within the composition ranges claimed by the present invention. Although only the combinations of two kinds of metals have been given in the above examples, it has now been found that the addition of one or more different kinds of metal to the said combinations is generally permissible only if the additive amount does not exceed 10 percent by weight on the basis of the weight of the parent composition. Such addition may be made without departing from the spirit and scope of the invention. As regards the atmosphere for the brazing purposes, an inert gas other than argon, a vacuum, or other atmosphere which is at least non-oxidizing may be suitable employed, if necessary.

Members consisting of graphite joined to metal have known utility. For instance, they are useful in electrical applications. Graphite-clad metal containers are useful for high temperature applications wherein the container is designed to hold materials that are either corrosive to the metal or which are at a temperature near or above the melting point of the metal in the container.

What is claimed is:
1. A joined body comprising:

a. a pyrolytic graphite member;
b. a metallic member, and
c. a joining member sandwiched in between the members (a) and (b) for joining together said members (a) and (b);

said joining member (c) comprising an alloy with a total proportion of not less than 90 percent by weight selected from a group of alloys consisting of:

1. Copper-chromium alloy wherein the chromium content ranges from 10 to 75 percent by weight of the alloy;
2. Silver-chromium alloy wherein the chromium content ranges from 10 to 85 percent by weight of the alloy; and
3. Gold-chromium alloy wherein the chromium content ranges from 10 to 75 percent by weight; the remainder of the components of said alloy being one or more different kinds of metal.

* * * * *